Nov. 7, 1944.   H. C. FRENCH   2,362,262
STEERING MECHANISM FOR TWO-WHEELED TRACTORS OR THE LIKE
Filed Jan. 29, 1943   4 Sheets-Sheet 1
*Fig. 1.*
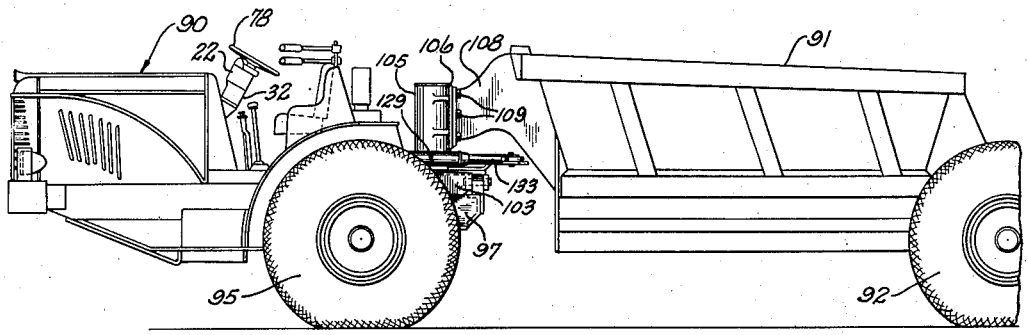
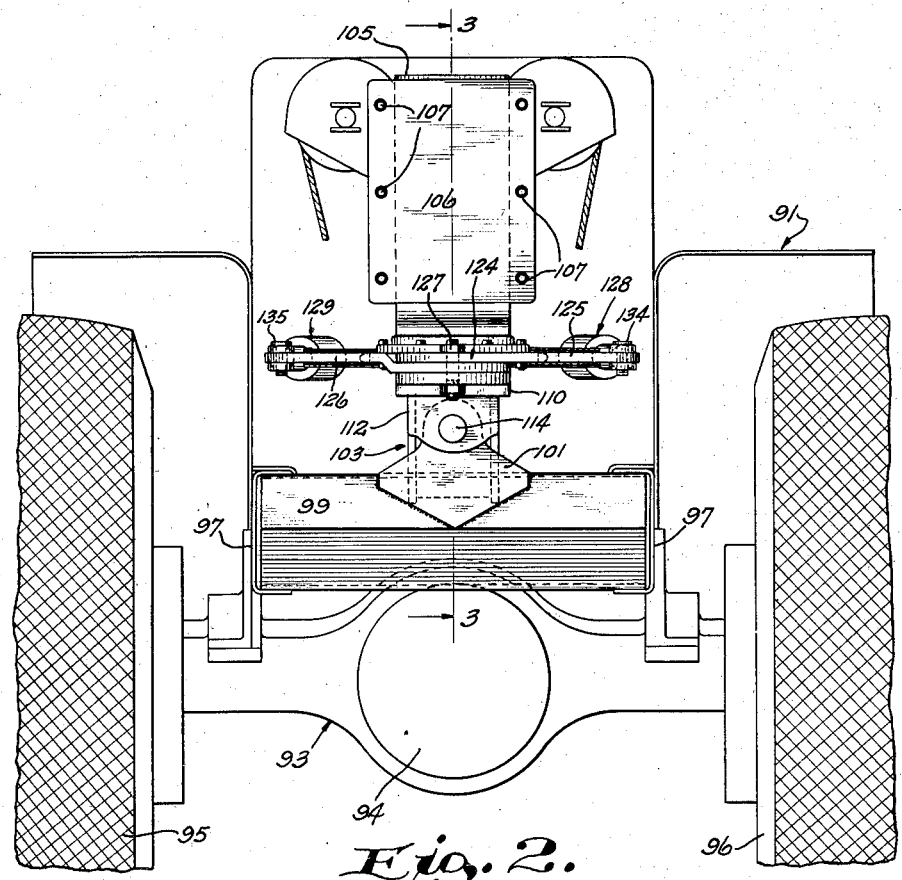
*Fig. 2.*
INVENTOR.
Henry C. French
BY Morsell & Morsell
ATTORNEYS.

Nov. 7, 1944.   H. C. FRENCH   2,362,262
STEERING MECHANISM FOR TWO-WHEELED TRACTORS OR THE LIKE
Filed Jan. 29, 1943   4 Sheets-Sheet 2

INVENTOR.
Henry C. French
BY Morsell & Morsell
ATTORNEYS.

Nov. 7, 1944.  H. C. FRENCH  2,362,262
STEERING MECHANISM FOR TWO-WHEELED TRACTORS OR THE LIKE
Filed Jan. 29, 1943  4 Sheets-Sheet 4
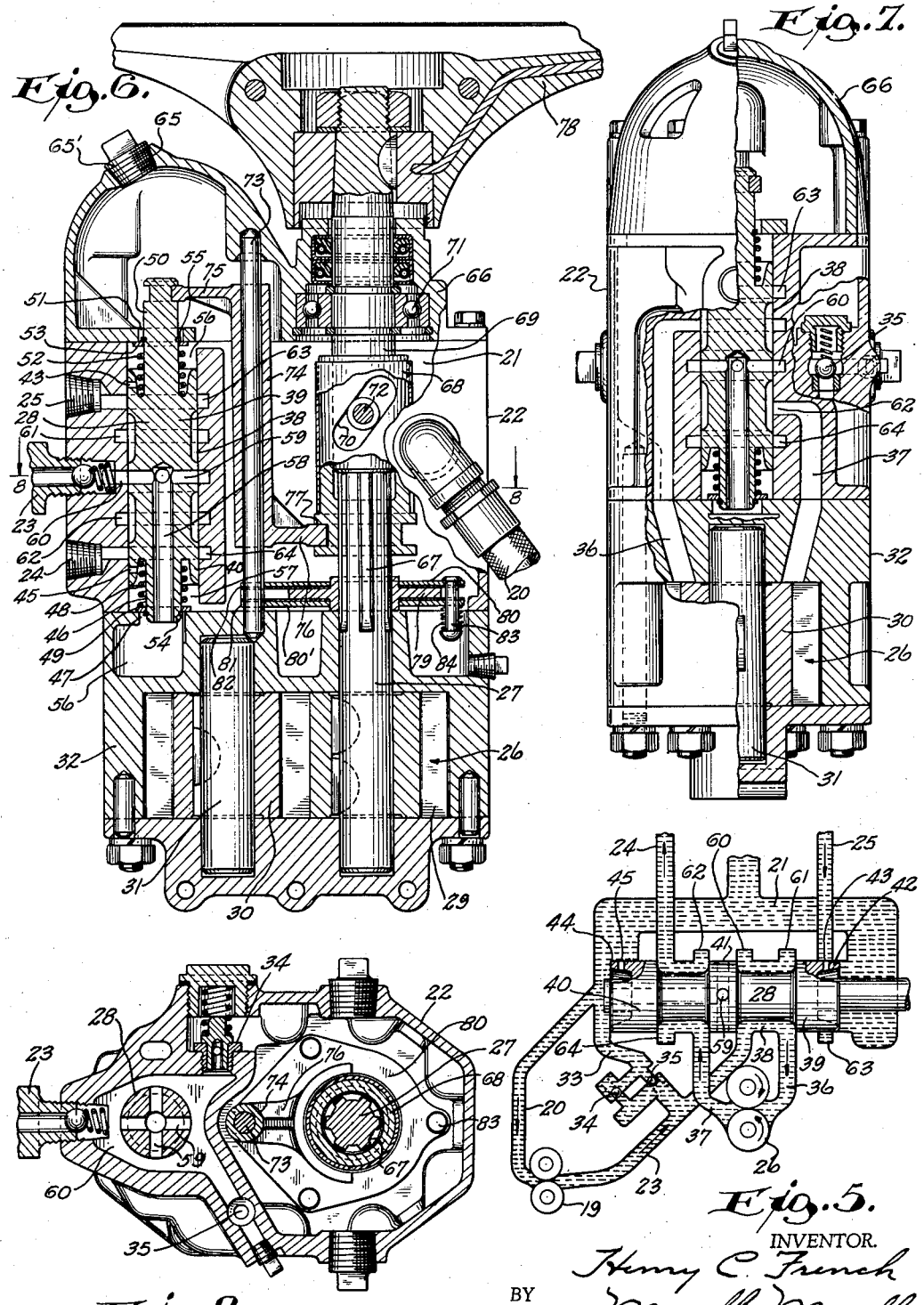
INVENTOR.
Henry C. French
BY Morsell & Morsell
ATTORNEYS.

Patented Nov. 7, 1944

2,362,262

UNITED STATES PATENT OFFICE 2,362,262

STEERING MECHANISM FOR TWO-WHEELED TRACTORS OR THE LIKE

Henry C. French, Elm Groove, Wis., assignor to The Heil Co., Milwaukee, Wis., a corporation of Wisconsin Application January 29, 1943, Serial No. 473,929

12 Claims. (Cl. 180—79.2)

This invention relates to improvements in steering mechanism for two-wheeled tractors or the like.

When two-wheeled tractors are employed for the purpose of pulling two-wheeled scrapers, two-wheeled dump wagons, or similar trailer units, the rear vehicle has a fifth wheel connection with the tractor and steering must be accomplished by causing a relative turning movement of the tractor while the fifth wheel serves as a pivot point. Heretofore, considerable difficulty has been encountered in providing a simple, quick acting, and sensitive steering method which will be effective under all of the varying ground conditions encountered in use. In pulling a trailer or scraper unit the tractor wheels on opposite sides may contact dirt or other material of quite different consistency, with the result that the wheel having the greater traction does the driving while the other wheel slips. Thus the pulling tractor might dodge or swing from side to side relative to the trailer unit in a manner which is entirely out of the control of the operator.

It is a general object of the present invention to obviate the above mentioned difficulties by providing improved steering mechanism wherein the relative swinging movement around the fifth wheel in either direction is normally prevented and wherein novel means is utilized for causing steering movement of the tractor and for causing relative pivotal movement at the fifth wheel in the direction which has been selected.

A more specific object of the invention is to provide in a device of the class described hydraulically operated means for causing relative pivotal movement at the fifth wheel.

A further more specific object of the invention is to provide a construction as above described including a vertical pivot column or equivalent member rigidly connectible to the trailer vehicle and an intermediate element on the tractor having a king pin, wherein a sprocket wheel surrounds and is connected to said vertical pivot column and wherein hydraulic rams are connected to the intermediate element, said rams being cooperable with the ends of a sprocket chain, which chain engages said sprocket wheel, to control the pivotal movement around the king pin.

A further object of this invention is to provide mechanism as above described wherein the intermediate or king pin carrying element is mounted on a longitudinal horizontally positioned pivot member on the tractor, and wherein the hydraulic rams and sprocket chain actuating members are mounted on said pivot member so that the sprocket chain is properly alined with the sprocket wheel regardless of the angular position of the tractor.

A further specific object of the invention is to provide a device as above described wherein the ends of the sprocket chain are connected to opposite ends of a yoke and wherein the ends of the hydraulic rams are also pivotally connected to said ends of the yoke to cause swinging movement of the latter and a pull in one direction or the other on said sprocket chain, the two sides of the yoke being independently pivoted on a common pivot point.

A further object of the invention is to provide a device as above described wherein operation of the hydraulic rams is controlled from a manual steering wheel and wherein steering is normally performed by a power driven hydraulic pump, there being provision, however, for emergency operation of the hydraulic rams through the medium of an auxiliary pump operated manually by the steering wheel.

With the above and other objects in view, the invention consists of the improved steering mechanism for two-wheeled tractors or the like, and all its parts and combinations as set forth in the claims, and all equivalents thereof. In the accompanying drawings illustrating one complete embodiment of the preferred form of the invention, in which the same reference numerals designate the same parts in all of the views, Fig. 1 is a side elevational view showing a tractor pulling a two-wheeled trailer wagon, the tractor being equipped with the improved steering mechanism;

Fig. 2 is a rear elevational view of the tractor, parts being broken away;

Fig. 5 is a diagrammatic view showing the improved hydraulic system;

Fig. 6 is a central vertical section through the manually operable control and actuating mechanism comprising part of the system of Fig. 5 and showing the control valve in neutral position;

Fig. 7 is an elevational view looking at the left-hand side of the structure of Fig. 2, part being broken away and shown in vertical section; and Fig. 8 is a transverse sectional view taken on line 8—8 of Fig. 6.

The hydraulic system

Figure 4:
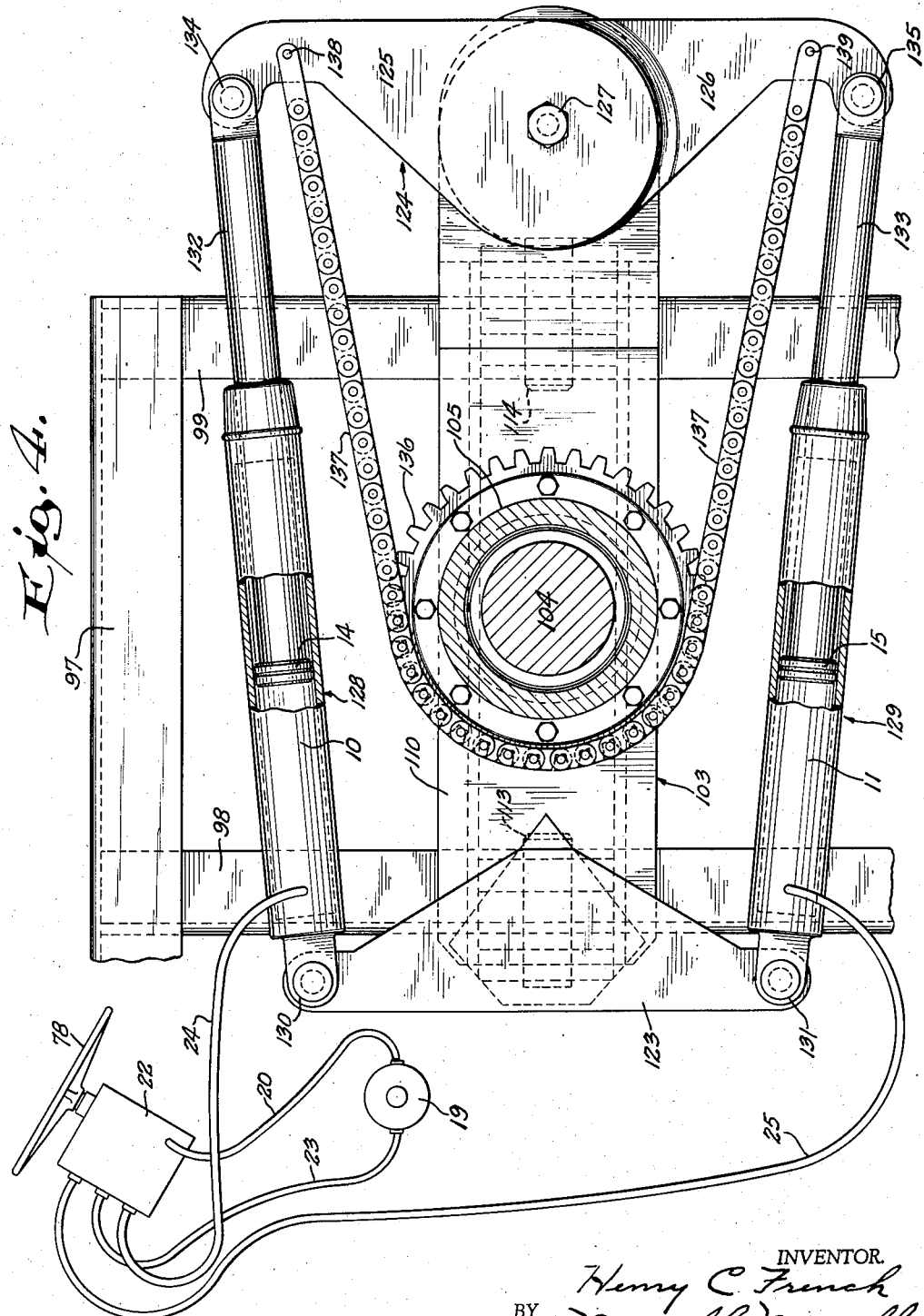
Fig. 4 is a sectional view taken approximately on the line 4—4 of Fig. 3, parts of the hydraulic cylinders being broken away, and the hydraulic system being shown schematically associated therewith.

Referring to the drawings, and more particularly to Figs. 4 and 5, the hydraulic system comprises in general a pair of cylinders 10 and 11 pivotally connected to a crosshead as at 130 and 131. Pistons 14 and 15 within the cylinders have their projecting ends or piston rods pivotally connected as at 134 and 135 to yoke members 125 and 126. A main or power pump 19 operable from the propelling motor of the vehicle, or from any other suitable source, has a suction or inlet conduit 20 communicating with a liquid or oil supply reservoir 21, which reservoir is located within the main housing 22, as shown in Fig. 6. The discharge conduit 23 from the power pump 19 is adapted to communicate, depending upon the position of the control valve, to be hereinafter described, with either of the conduits 24 or 25 connecting with the cylinders 10 and 11. A manual pump 26, operable by the lower steering column section 27 (see Fig. 6), communicates with the discharge conduit 23 from the power pump 19 and also with the conduits 24 and 25 through the medium of the control valve 28.

Both of the pumps 19 and 26 are preferably of the intermeshing gear type, and the gears 29 and 30 of the manually operable pump 26 are secured respectively to the lower steering column section 27 and to a shaft 31. The latter are journalled for rotation in a pump casing 32 which is secured beneath the casing 22 for the reservoir 21 and control valve 28.

The system also includes an adjustable pressure relief valve 34 and a non-return check valve 35. The manual pump 26 is reversible in action and has inlet and discharge conduits 36 and 37 communicating with the bore 38 of the control valve 28 and adapted to be interchangeably connected by valve movement with the discharge conduit 23 from the main pump 19 and with the conduits 24 or 25.

The control valve 28 is slidable in the bore 38 and has opposite end pistons 39 and 40 and an intermediate piston 41 snugly cooperable with the bore 38. The end piston 39 has an annular extension flange 42 formed with a single restrictive opening or port 43 therein. The piston 40 at the opposite end of the valve has a similar annular extension flange 44 formed with a single restrictive opening or port 45.

The valve 28 has a bottom stem 46 slidable through an opening 47. A coil spring 48 surrounding the stem 46 has its lower end seated on a collar 49 which is slidable on the stem. The collar 49 in turn overlaps the marginal edges of the opening 47. Thus when the control valve is moved downwardly, referring to Fig. 6, the spring 48 is compressed.

At the upper end of the control valve is a longer stem 50 which projects through an opening 51. The lower portion of this stem is surrounded by a coil spring 52 which has its upper end cooperable with a slidable collar 53 overlapping the marginal edges of the opening 51. Retaining rings 54 and 55 cooperate with the collars 49 and 53 respectively. A chamber 56 surrounding the lower portion of the stem 50 is in communication with the oil reservoir 21, as shown in Fig. 6, and a chamber 57 surrounding the lower stem 46 is also in communication with the reservoir 21 and with an axial duct 58 in the control valve, which duct extends to the center of the control valve and communicates with radial ducts 59 formed in the intermediate piston 41.

The discharge conduit 23 from the main pump 19 communicates with the central valve chamber 60 with which the radial ducts 59 are in open communication when the valve 28 is in the neutral position of Fig. 6. When the pump 19 is operating with the valve in this neutral position the hydraulic liquid is merely being circulated from the supply reservoir 21 through the conduit 20, pump 19, conduit 23, annular port 60, radial ducts 59, axial bore 58, chamber 57, back to the reservoir 21.

The valve bore 38 is also provided with annular ports 61 and 62 spaced equidistant from the central annular port 60 and communicating with the conduits 36 and 37 respectively of the manual pump 26. In addition there are opposite end annular ports 63 and 64 communicating with the conduits 25 and 24 respectively, which latter conduits lead to the steering gear operating cylinders 11 and 10. The valve ports 62 and 61 are adapted to be interchangeably and alternately connected, depending upon the position of the valve, either to the central port 60 or to the end ports 63, 64, so as to admit liquid under pressure from the main pump 19, through the manual pump 26, and thence through the valve to either the displacement chamber of the cylinder 10 or the displacement chamber of the cylinder 11 through one of the end annular ports 64 or 63. If hydraulic medium is forced through the conduit 24 to the displacement chamber of the cylinder 10, then this will cause return of a corresponding amount of fluid from the displacement chamber of the cylinder 11 to the reservoir.

The main casing 22 may be formed of several sections detachably interconnected, and the reservoir 21 is provided at its highest portion with a filling opening 65 normally closed by a removable plug 65'. The conduits 20, 23, 24, and 25, which communicate with the casing 22, may be flexible so as to permit relative movement of the interconnected parts, and the control valve assemblage is housed within the casing 22 above the casing 32 for the manual pump 26, thus providing a unitary reservoir pump and valve assembly. The casing 22 is provided with a removable cover 66, and by virtue of the sectional construction of the casings 22 and 32 all of the enclosed pump and valve parts are readily accessible for inspection and may be readily assembled and dismantled. The relief and non-return valves 34 and 35 may also be housed within the casing 22.

The gears 29 and 30 of the manual pump 26 are snugly fitted within the casing 32 and accurately coact with each other so as to prevent free passage of liquid through this pump. The upper end of the shaft 27 for the gear 29, which forms the lower steering column section, is provided with splines 67 which have sliding coaction with the splined lower portion of a sleeve 68. This sleeve has its upper end open for the reception of the upper steering column section 69 and is also formed with one or more inclined slots 70. The upper steering column section 69 is journalled for rotation in an anti-friction bearing 71 carried by the cover section 66 in the axial alinement with the lower steering column section 27. The upper steering column section 69 has snug coaction with the bore of the sleeve 68, while being rotatable therein, and is provided with integral pins 72 extending radially therefrom and coacting with the slot 70 of the sleeve 68.

Intermediate the valve and the steering column is a vertically disposed guide rod 73 on which a valve actuating sleeve 74 is slidable. The upper end of the sleeve 74 has a horizontal extension 75 which is cooperable with the upper end of the valve stem 50, as shown in Fig. 6, to cause actuation of the valve when the sleeve 74 is moved longitudinally on the guide rod 73. The lower end of the sleeve 74 has a similar extension 76 which coacts with a slot 77 at the lower end of the steering column sleeve 68. Thus if the lower steering column section 27 is held against rotation, then when the tractor steering wheel 78 connected to the upper end of the steering column section 69 is rotated, the upper steering column section 69 will rotate independently of the lower steering column section 27 and the pin 72 will ride in one direction or the other in the slot 70, causing a raising or lowering of the sleeve 68, a raising or lowering of the valve actuating sleeve 74, and movement of the valve 28 in one direction or the other.

It is not necessary to rely upon a proper fit of the gears 29 and 30 of the manual gear pump plus a proper oil level in this pump to impose sufficient resistance upon the lower steering column section 27 in order to prevent rotation thereof with the upper steering column section when valve actuation is desired. Such resistance is imposed independently of the manual pump. Referring to Fig. 6, a disk 79 is splined to the lower steering column section, and this disk fits between bronze facings on the inner sides of plates 80 and 80'. These latter disks are provided with recessed projections 81 and 82 which embrace the guide rod 73 to prevent turning movement of the disks 79 and 80. In addition one or more pins 83 extending through the disk and having coil springs 84 thereon are arranged to yieldingly urge the plates 80 and 80' together. Thus sufficient resistance by friction to turning of the lower steering column section 27 is always present in order to provide for immediate actuation of the valve 28 independently of any resistance to turning movement of the lower steering column section which may be afforded by the manual pump 26. Thus there is a positive mechanically operating valve which is not dependent upon a perfect fit of the gears 29 and 30 and which is not dependent upon a proper oil condition in the hydraulic system. Thus even though the gears 29 and 30 wear to such an extent that there is slippage, proper actuation of the valve will not be affected. Also leaks in the hydraulic system which might effect the oil level in the gear pump 26 will have no effect upon proper valve actuation.

During normal operation of the hydraulic system the reservoir 21, pumps, cylinders, passageways, and conduits should first be supplied with an abundance of liquid such as oil and air pockets should be eliminated. When the tractor and trailer wheels are set for straight-line movement of the vehicle, the steering wheel 78 will be disposed so as to place and retain the control valve in the neutral position of Fig. 6. The main or power pump 19 which is being constantly operated by the propelling motor of the vehicle will then withdraw liquid from the reservoir 21 through the suction conduit 20 and will return the liquid to the supply reservoir through the discharge conduit 23, annular port 60, radial ducts 59, axial valve bore 58, and chamber 57 without subjecting the manual pump 26 to pressure. If the steering wheel 78 is shifted from neutral to cause the pins 72 to coact with the slots 70 of the sleeve 68, so as to raise the valve actuating sleeve 74 upwardly, and raise the control valve 75 28 from the position of Fig. 6, then the radial passages 59 and axial bore 58 of the valve will be shut off and the main or power pump discharge conduit 23 will be brought into communication with the hand pump conduit 36 through the annular valve ports 60, 62, thereby causing the liquid under pressure to rotate the gears of the manual pump 26 in a direction opposite to that of Fig. 5. The liquid under pressure thus passing through the pump 26 besides assisting the operator in turning the steering wheel 78 will pass through the conduit 36 beyond the manual pump and from thence through the annular ports 61 and 63 and conduit 25 to the displacement chamber of the cylinder 11 to cause steering toward the right, referring to Fig. 1. At the same time movement of the piston for the cylinder 10 will cause exhausting of fluid from the displacement chamber of the cylinder 10 and return of said fluid through the conduit 24 and valve to the reservoir. When the parts are in this position it is to be noted that the annular flange 44 obstructs flow from the line 24 into the valve, as shown in Fig. 5, except for the restrictive opening 45. This opening 45 is just large enough to take care of the normal return flow caused by the regular steering rate and is designed so that the rate of flow permitted therethrough is the same as the rate of flow from the power pump 19 when the latter is operating normally. If a wheel should strike an obstruction tending to cause quicker steering movement, this is prevented because the oil can return only as fast as the restrictive port 45 will permit. Thus it is impossible to force more oil into the reservoir than the reservoir can accommodate, and over steering is prevented.

If the steering wheel 78 is turned in a reverse direction from that just described to cause the pins 72 to coact with the slot 70 so as to move the valve sleeve 74 and valve downwardly, then the radial ducts 59 and axial bore of the valve will again be shut off and the main pump discharge conduit 23 will be brought into communication with the hand pump conduit 36 through the annular valve ports 60 and 61, as shown in Fig. 5, thereby causing the liquid under pressure to rotate the manual pump 26 in the direction indicated in Fig. 5. The liquid under pressure passing through the pump 26, besides assisting the operator in turning the steering wheel 78 in a desired direction, will pass through the conduit 37 beyond the pump and from thence through the annular ports 62 and 64 and conduit 24 to the displacement chamber of the cylinder 10. Simultaneously the piston of the cylinder 11 will exhaust liquid through the conduit 25, restrictive port 43, and into the reservoir 21. This will cause steering to the left, referring to Fig. 1. In this direction also the single restrictive port 43 will meter the returning fluid so as to prevent over steering.

When the steering wheel is operated to return the valve 28 to the neutral position, after steering in either direction has been effected, the wheels of the tractor and trailer are held in alined position by virtue of the fact that the liquid is then confined within the displacement chambers of the cylinders 10 and 11 and within the conduits 24 and 25.

If for any reason the power pump 19 should fail, steering may still be effected by manually turning the hand wheel 78 in either direction. This first causes actuation of the valve as heretofore described, and then because of the splined connection between the sleeve 68 and lower steering column section 27, manual rotation of the gears in the gear pump 26.

When the pistons in the cylinders 10 and 11 reach the end of their stroke while moving in either direction, the pressure in the discharge conduit 23 will rise and the relief valve 34 will then function to relieve the high pressure in the pump discharge conduit by permitting the admitted liquid to escape directly to the supply reservoir 21. The check valve 35 is provided for the purpose of permitting liquid to be withdrawn from the supply reservoir 21 into the manual pump 26 either when the power pump 19 fails or when the steering wheel 78 is operated to actuate the pump 26 faster than the power pump can feed liquid thereto.

*General construction of the tractor and trailer*

The improved tractor is designated generally by the numeral 90 and is adapted to pull a trailer vehicle 91 having a single pair of rear wheels 92. In Fig. 1 of the drawings a trailer dump wagon is illustrated, but the tractor is adapted for use in connection with two-wheeled scrapers or any other two-wheeled trailer vehicles.

Referring to Fig. 2, the tractor has a single axle assembly 93 including a standard differential 94 having differential gears driven by the usual transmission from the tractor engine. On one end of the axle is a wheel 95, and on the other end a wheel 96. The wheel and axle assembly including the differential 94, is identical to that employed in the rear axle of the common type of four-wheeled automotive vehicle, wherein when making a turn the differential gearing permits one of the driven wheels to rotate more slowly or not at all while the other wheel does the driving as the turn is being effected.

The tractor frame includes spaced longitudinally extending side members 97 connected by transverse frame members including members 98 and 99 at the rear. Suitably connected to the transverse members 98 and 99 intermediate the length thereof and projecting upwardly therefrom are bearings 100 and 101 having bores 102 which extend longitudinally of the tractor.

*The fifth wheel and associated steering mechanism*

Figure 3:
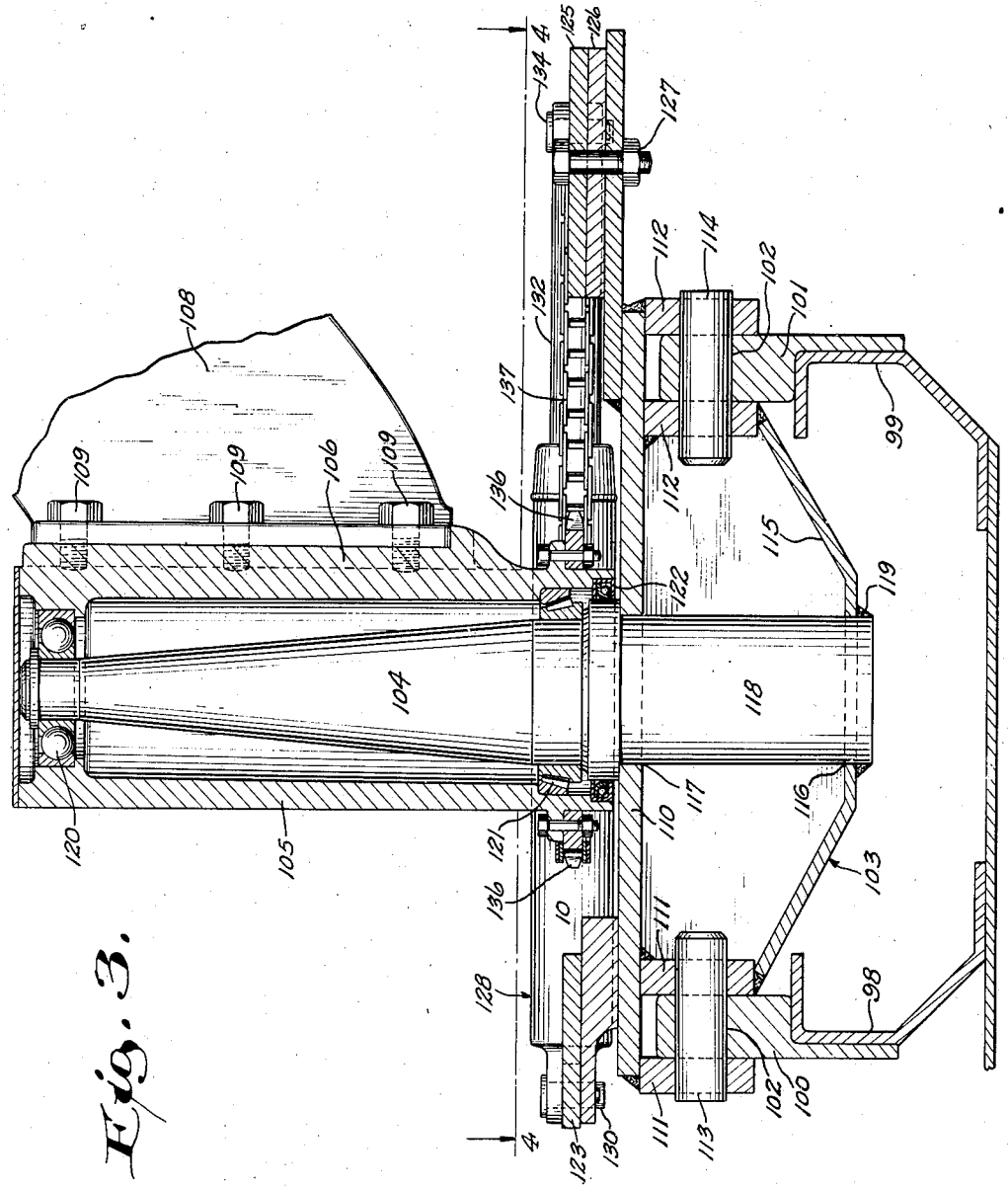
Fig. 3 is a longitudinal vertical section through the fifth wheel, parts being broken away.

The fifth wheel includes an intermediate element 103 having an upwardly projecting king pin 104 constituting a first fifth wheel member and a cooperating fifth wheel member 105 which is rotatable around the king pin 104. The cooperating fifth wheel member 105, or vertical pivot column, carries a rigid rearwardly facing plate 106 formed with bolt holes 107. Thus the forwardly projecting neck 108 of the trailer vehicle 91, or of any other selected trailer vehicle, may be rigidly connected to the vertical pivot column 105 by means of bolts 109 as illustrated in Figs. 1 and 3.

The intermediate element 103 carrying the king pin or first fifth wheel member 104 comprises a top plate 110 having spaced depending pivot lugs 111 at one end and 112 at the other end. Pins 113 and 114 extending through the bores 102 of the bearings 100 and 101 and through the lugs 111 and 112 connect the intermediate element 103 to the tractor to permit pivotal movement on a longitudinal axis.

Between the innermost lugs 111 and 112 and below the plate 110 is a closed box 115 having a hole 116 in its bottom. There is also an alined hole 117 in the top plate 110. Thus the lower extension 118 of the king pin 104 may extend downwardly through the holes 117 and 116 and be welded rigidly in position as at 119. Surrounding the upper portion of the king pin is a bearing set 120, and surrounding the lower portion is a bearing set 121. Thus the vertical pivot column 105 may rotate on the bearings 120 and 121 around the king pin. An annular seal 122 may also be provided below the bearing set 121. It is thus apparent that the vertical pivot column 105 or cooperating fifth wheel member may rotate with the trailer vehicle around the king pin 104. At the same time, in view of the fact that the king pin 104 is a part of the pivoted intermediate element 103, there may be a rocking motion on the pins 113 and 114 to compensate for unevenness of the ground.

Secured rigidly to the forward end of the top plate 110 is a transverse crosshead 123 (see Fig. 4). At the opposite end of the plate 110 is a yoke designated generally by the numeral 124. This yoke comprises an arm 125 projecting laterally in one direction and an independent arm 126 projecting in the opposite direction. The arms 125 and 126 are both pivoted for swinging movement in a horizontal plane on the pivot pin 127.

Hydraulic rams 128 and 129 each have one end pivotally connected as at 130 and 131 to the crosshead 123. These rams have rearwardly projecting piston rods 132 and 133. The extreme end of the rod 132 is pivotally connected as at 134 to the end of the yoke arm 125, and the extreme end of the piston rod 133 is pivotally connected as at 135 to the end of the yoke arm 126. The hydraulic conduit 24 is connected to the displacement chamber of the cylinder 10, and the hydraulic conduit 25 is connected to the displacement chamber of the hydraulic ram 129.

Rigidly secured to and surrounding the lower end of the cooperating fifth wheel member 105 or vertical pivot column is a sprocket wheel 136. A sprocket chain 137 has one end connected to the yoke arm 125 as at 138, and extends around the sprocket wheel 136 and has its other end connected to the yoke arm 126 as at 139.

In view of the fact that it is not practical to have the connection points 138 and 139 for the sprocket chain located the same as the pivot points 134 and 135, there is necessarily slightly greater radius of movement for the pivot points 134 and 135 than for the sprocket chain connection points 138 and 139. For this reason the yoke has been made with the two independent arms 125 and 126 so that there can be a slight compensating movement of one arm with respect to the other during operation.

*Operation of the steering mechanism*

In order to cause steering movement of the tractor while pulling a trailer vehicle such as the vehicle 91, the manual steering wheel 78, which is mounted in the conventional position shown in Fig. 1, is rotated in a desired direction to control the operation of the hydraulic system as heretofore described in detail. When the steering wheel 78 is turned in a direction to cause a flow of hydraulic fluid through the hydraulic line 24 into the displacement chamber of the hydraulic ram 128, this causes an outward movement of the piston rod 132, toward the rear of the tractor. This in turn causes pivotal movement of the yoke 124 in a clockwise direction and a pull from the point 138 upon the chain 137. As a result of this movement the sprocket wheel 136 is rotated in a clockwise direction, referring to Fig. 4, resulting in a steering movement toward the left, referring to Fig. 1. A pull upon the end 138 of the sprocket chain causes a simultaneous pull in the opposite direction on the end 139 of the sprocket chain and inasmuch as fluid is being exhausted from the displacement chamber of the ram 129, there is an inward movement of the piston rod 133 into the cylinder of the ram 129.

When the steering wheel 78 is turned in the reverse direction to cause flow of hydraulic fluid under pressure through the line 125 into the displacement chamber of the hydraulic ram 129, then the reverse action takes place. The yoke is swung in a counter-clockwise direction, the sprocket wheel 136 is rotated in a counter-clockwise direction (referring to Fig. 4), and the tractor turns toward the right, referring to Fig. 1.

When a turn is being effected the differential 94 in the tractor axle 93 permits the driving movement of one wheel around the other.

When the steering wheel 78 is in the neutral position, with the valve parts in the position of Fig. 6, after steering in either direction has been effected, the hydraulic rams and yoke are held in the neutral position of Fig. 4. This is due to the fact that the hydraulic fluid is confined within the displacement chambers of the cylinders of the rams 128 and 129 and within the conduits 24 and 25. This neutral position of the hydraulic rams also prevents undesirable swinging movement of the trailer vehicle during forward movement in a straight line.

By the use of the hydraulic system heretofore described, in combination with the improved fifth wheel steering mechanism, even if there should be a failure in the hydraulic system connected with the power pump, steering can still be effected because oil will be pumped manually by the steering wheel operated oil pump 26. This emergency operation has been heretofore described in detail in connection with the operation of the hydraulic system.

Although only one form of the invention has been shown and described, it is obvious that various changes and modifications may be made without departing from the spirit of the invention, and all of such changes are contemplated as may come within the scope of the claims.

What I claim is:

1. In combination, a two-wheeled pulling vehicle, a trailer vehicle, an intermediate element including a first fifth wheel pivot member on the pulling vehicle, a cooperating fifth wheel pivot member rotatable with respect to said first fifth wheel pivot member and connected to the trailer vehicle, a sprocket wheel on the cooperating fifth wheel pivot member, a sprocket chain in engagement with said sprocket wheel, and means connected to the intermediate element and to said chain for causing rotation of the sprocket wheel and cooperating fifth wheel pivot member.

2. In combination, a two-wheeled pulling vehicle, a trailer vehicle, an intermediate element including a first fifth wheel pivot member on the pulling vehicle, a cooperating fifth wheel pivot member rotatable with respect to said first fifth wheel pivot member and connected to the trailer vehicle, a sprocket wheel on the cooperating fifth wheel pivot member, a sprocket chain in engagement with said sprocket wheel, a yoke having oppositely projecting arms to which the ends of said sprocket chain are connected, means intermediate the connections for the sprocket chain for pivotally connecting said yoke to the intermediate element, and means for causing pivotal movement of said yoke in a selected direction to cause rotation of the sprocket wheel.

3. In combination, a two-wheeled pulling vehicle, a trailer vehicle, an intermediate element including a first fifth wheel pivot member on the pulling vehicle, a cooperating fifth wheel pivot member rotatable with respect to said first fifth wheel pivot member and connected to the trailer vehicle, a sprocket wheel on the cooperating fifth wheel pivot member, a sprocket chain in engagement with said sprocket wheel, a yoke having oppositely projecting arms to which the ends of said sprocket chain are connected, means intermediate the connections for the sprocket chain for pivotally connecting said yoke to the intermediate element, and hydraulic rams each having one end pivotally connected to the intermediate element and having opposite ends pivotally connected to the ends of said yoke for causing pivotal movement of said yoke and rotation of the sprocket wheel in a selected direction.

4. In combination, a two-wheeled pulling vehicle, a trailer vehicle, an intermediate element including a first fifth wheel pivot member on the pulling vehicle, a cooperating fifth wheel pivot member rotatable with respect to said first fifth wheel pivot member and connected to the trailer vehicle, a sprocket wheel on the cooperating fifth wheel pivot member, a sprocket chain in engagement with said sprocket wheel, a yoke having oppositely projecting arms to which the ends of said sprocket chain are connected, means intermediate the connections for the sprocket chain for pivotally connecting said yoke to the intermediate element, and hydraulic rams each having one end pivotally connected to the intermediate element and having opposite ends pivotally connected to the ends of said yoke for causing pivotal movement of said yoke and rotation of the sprocket wheel in a selected direction, the oppositely projecting arms of said yoke being mounted for independent movement.

5. In combination, a pulling vehicle, a trailer vehicle, an intermediate element including a first fifth wheel pivot member mounted on the pulling vehicle for rocking movement on a horizontal axis extending longitudinally of the pulling vehicle, a cooperating fifth wheel pivot member rotatable with respect to said first fifth wheel pivot member and connected to the trailer vehicle, an actuating member pivoted to said intermediate element hydraulically operated ram mechanism connected at one end to the intermediate element and at the other end to said actuating member for moving the latter on its pivot, and mechanical motion transmission means connecting said actuating element and said cooperating fifth wheel pivot member for causing relative rotation in a selected direction between said two fifth wheel pivot members.

6. In combination, a two-wheeled pulling vehicle, a trailer vehicle, an intermediate element including a first fifth wheel pivot member mounted on the pulling vehicle for rocking movement on a horizontal axis extending longitudinally of the pulling vehicle, a cooperating fifth wheel pivot member, rotatable with respect to said first fifth wheel pivot member and connected to the trailer vehicle, a sprocket wheel on the cooperating fifth wheel pivot member, a sprocket chain in engagement with said sprocket wheel, and means connected to the intermediate element and to said chain for causing rotation of the sprocket wheel and cooperating fifth wheel pivot member.

7. In combination, a pulling vehicle, a trailer vehicle, an intermediate element rockably mounted on the pulling vehicle on a horizontal axis extending longitudinally of the pulling vehicle and including a first fifth wheel pivot member, a cooperating fifth wheel pivot member rotatable with respect to said first fifth wheel pivot member and connected to the trailer vehicle, an hydraulic ram supported on said intermediate element, cooperating mechanical means including a circular toothed member on the cooperating fifth wheel pivot member actuated by said hydraulic ram for causing relative rotation in a selected direction between said two fifth wheel pivot members, and means controllable from the driver's seat of the tractor for operating said hydraulic ram.

8. In combination, a two-wheeled pulling vehicle, a trailer vehicle, an intermediate element including an upstanding king pin, said intermediate element being mounted on the pulling vehicle for rocking movement on a horizontal axis extending longitudinally of the pulling vehicle, a cross-head at one end of said intermediate element, a yoke having oppositely projecting arms and pivoted intermediate its length to the other end of said intermediate element, a vertical pivot column connected to the trailer vehicle and rotatable on said king pin, a sprocket wheel surrounding and connected to said pivot column, a sprocket chain having one end connected to one arm of said yoke and extending around said sprocket chain and having its other end connected to the other arm of said yoke, and hydraulic rams pivotally connected between the ends of said cross-head and the ends of said yoke arms for causing pivotal movement of said yoke and rotation of the sprocket wheel and vertical pivot column in a selected direction.

9. In combination a pulling vehicle, a trailer vehicle, an intermediate element including a first fifth wheel pivot member mounted on the pulling vehicle for rocking movement on a horizontal axis extending longitudinally of the pulling vehicle, a cooperating fifth wheel pivot member having a circular toothed element connected thereto and rotatable with respect to said first fifth wheel pivot member and connected to the trailer vehicle, at least one hydraulically operated ram including the cylinder therefor supported entirely on said intermediate element and rockable therewith, and mechanical motion transmission means connecting said ram to said circular toothed element on the cooperating fifth wheel pivot member for causing relative rotation in a selected direction between said two fifth wheel pivot members.

10. In combination, a pulling vehicle, a trailer vehicle, an intermediate element including a first fifth wheel pivot member having an upstanding king pin mounted on the pulling vehicle for rocking movement on a horizontal axis extending longitudinally of the pulling vehicle, a cooperating fifth wheel pivot member having a circular toothed element connected thereto insertable in position on the king pin by vertical movement and rotatable thereon, said cooperating fifth wheel pivot member being connected to the trailer vehicle, at least one hydraulically operated ram including the cylinder therefor supported entirely on said intermediate element and rockable therewith, and mechanical motion transmission means connecting said ram to said circular toothed element on the cooperating fifth wheel pivot members for causing relative rotation in a selected direction between said two fifth wheel pivot members.

11. In combination, a pulling vehicle, a trailer vehicle, an intermediate element including a first fifth wheel pivot member on the pulling vehicle, a cooperating fifth wheel pivot member rotatable with respect to said first fifth wheel pivot member and connected to the trailer vehicle, a toothed element surrounding the cooperating fifth wheel pivot member, a yoke having oppositely projecting arms pivotally connected to the intermediate element, hydraulic rams each having one end pivotally connected to the intermediate element and having opposite ends pivotally connected to the ends of said yoke for causing pivotal movement of the yoke, and transmission means between the yoke and toothed element on the cooperating fifth wheel pivot member for causing rotation of the latter in a selected direction.

12. In combination, a pulling vehicle, a trailer vehicle, an intermediate element including an upstanding king pin, said intermediate element being mounted on the pulling vehicle for rocking movement on a horizontal axis extending longitudinally of the pulling vehicle, a yoke having oppositely projecting arms and pivoted intermediate its length to the intermediate element, a vertical pivot column connected to the trailer vehicle and rotatable on said king pin, a toothed element surrounding and connected to said pivot column, transmission means between said yoke and toothed element, and hydraulic rams pivotally connected between the intermediate element and the ends of said yoke arms for causing pivotal movement of said yoke and rotation of the toothed element and vertical pivot column in a selected direction.

HENRY C. FRENCH.